E. R. SMITH ET AL

Aug. 9, 1932. Re. 18,559

WORK HANDLING MECHANISM FOR MACHINE TOOLS

Original Filed Jan. 28, 1929 11 Sheets-Sheet 1

Inventors
Edwin R. Smith
Albert Schrinker
By Attorneys
Southgate Fraser Hawley

E. R. SMITH ET AL

Aug. 9, 1932. Re. 18,559

WORK HANDLING MECHANISM FOR MACHINE TOOLS

Original Filed Jan. 28, 1929 11 Sheets-Sheet 2

Inventors
Edwin R. Smith
Albert Schrinker
By Attorneys
Southgate Hayes & Hawley

E. R. SMITH ET AL

Aug. 9, 1932. Re. 18,559

WORK HANDLING MECHANISM FOR MACHINE TOOLS

Original Filed Jan. 28, 1929 11 Sheets-Sheet 3

Inventors
Edwin R. Smith
Albert Schinka2
By Attorneys
Southgate Fraser Hawley

E. R. SMITH ET AL

Aug. 9, 1932.

Re. 18,559

WORK HANDLING MECHANISM FOR MACHINE TOOLS

Original Filed Jan. 28, 1929 11 Sheets-Sheet 4

Inventors
Edwin R. Smith
Albert Schinker
By Attorneys
Leathgate Fay & Hawley

E. R. SMITH ET AL

Aug. 9, 1932. Re. 18,559

WORK HANDLING MECHANISM FOR MACHINE TOOLS

Original Filed Jan. 28, 1929 11 Sheets-Sheet 5

Inventors
Edwin R. Smith
Albert Schinker
By Attorneys
Southgate Fayn Hawley

E. R. SMITH ET AL

Aug. 9, 1932. Re. 18,559

WORK HANDLING MECHANISM FOR MACHINE TOOLS

Original Filed Jan. 28, 1929 11 Sheets-Sheet 6

Inventors
Edwin R. Smith
Albert Schrinker
By Attorneys
Southgate Hays & Hawley

E. R. SMITH ET AL

Aug. 9, 1932. Re. 18,559

WORK HANDLING MECHANISM FOR MACHINE TOOLS

Original Filed Jan. 28, 1929 11 Sheets-Sheet 7

Inventors
Edwin R. Smith
Albert Schinkez
By Attorneys
Southgate Hayes & Hawley

E. R. SMITH ET AL
Aug. 9, 1932. Re. 18,559
WORK HANDLING MECHANISM FOR MACHINE TOOLS
Original Filed Jan. 28, 1929 11 Sheets-Sheet 8
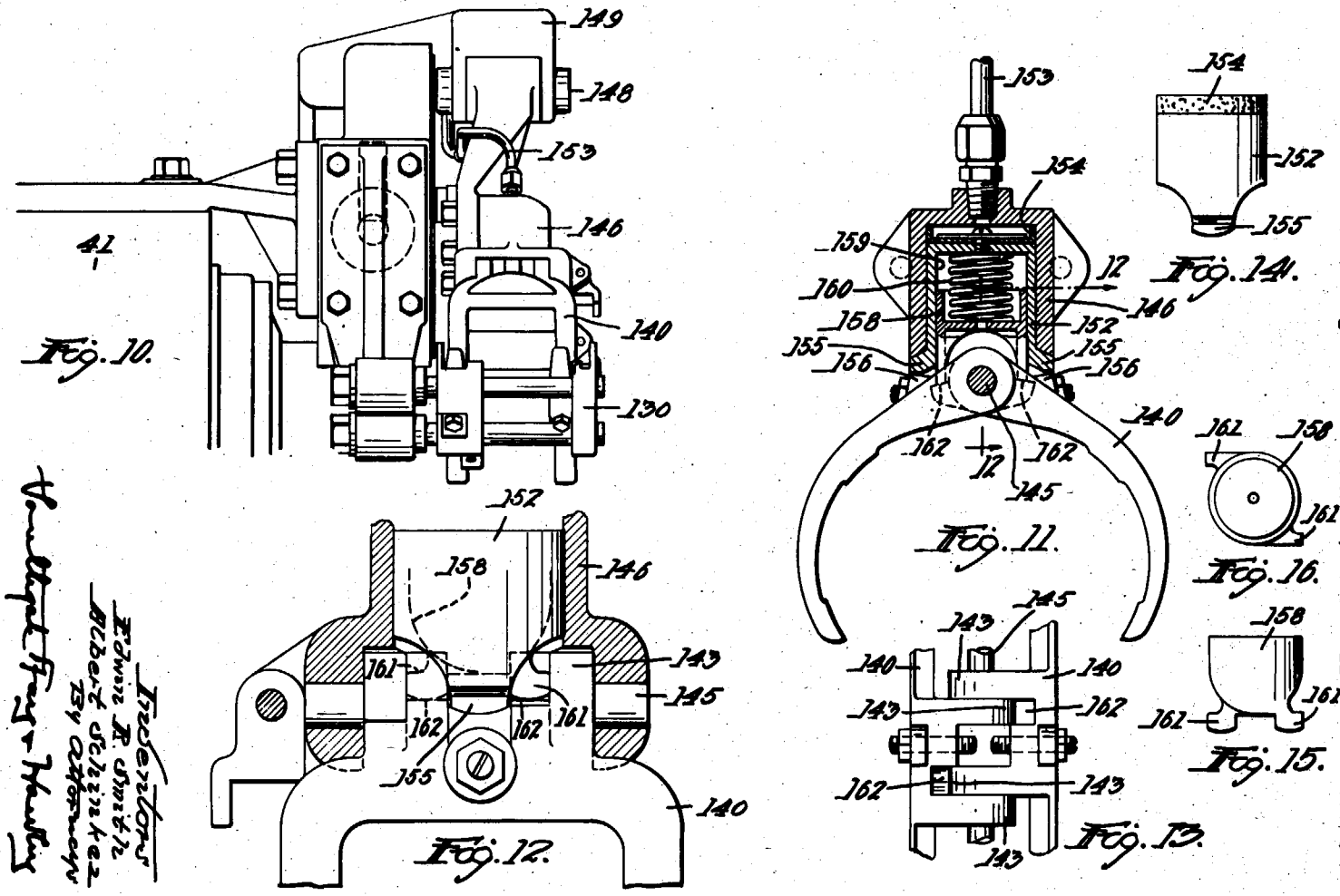
Inventors
Edwin R. Smith
Albert Schinker
By Attorneys
Van Santvoord Fraser & Hawley E. R. SMITH ET AL
Aug. 9, 1932. Re. 18,559
WORK HANDLING MECHANISM FOR MACHINE TOOLS
Original Filed Jan. 28, 1929 11 Sheets-Sheet 9
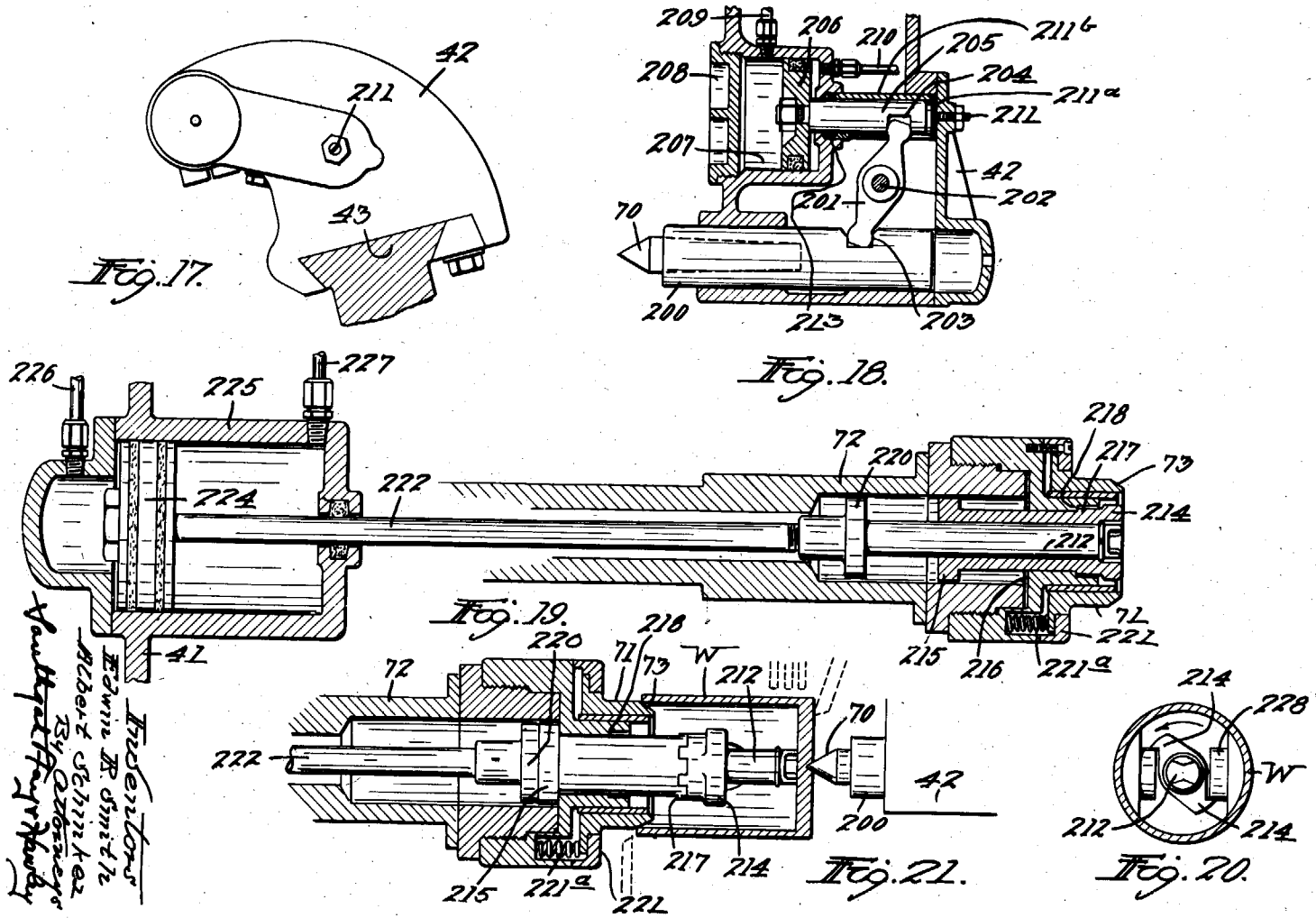

E. R. SMITH ET AL
Aug. 9, 1932. Re. 18,559
WORK HANDLING MECHANISM FOR MACHINE TOOLS
Original Filed Jan. 28, 1929 11 Sheets-Sheet 10
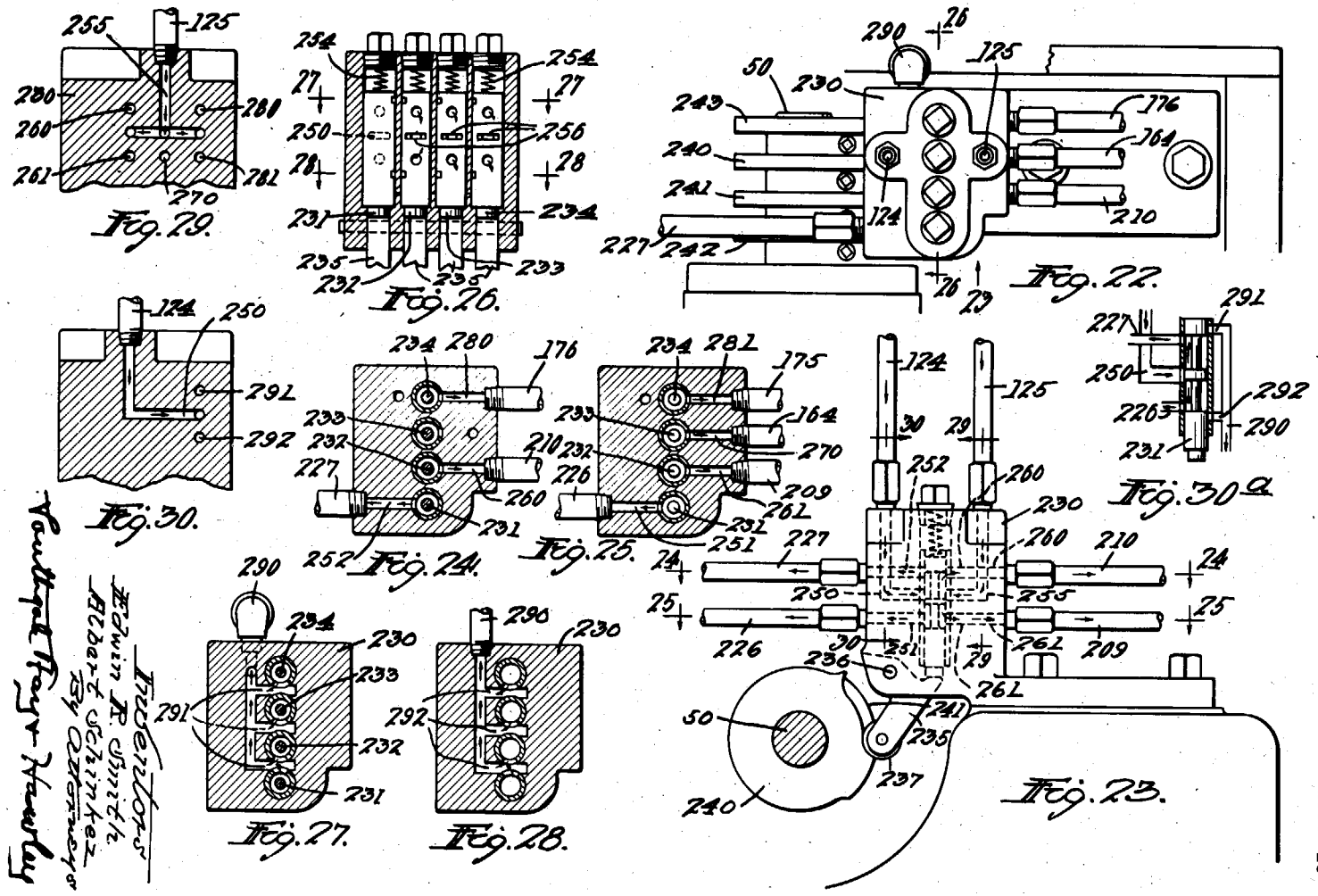
Inventors
Edwin R. Smith
Albert Schinkez
By Attorneys
Southgate Hays & Hawley

E. R. SMITH ET AL

Aug. 9, 1932. Re. 18,559

WORK HANDLING MECHANISM FOR MACHINE TOOLS

Original Filed Jan. 28, 1929 11 Sheets-Sheet 11

Inventors
Edwin R. Smith
Albert Schinker
By Attorneys
Southgate Hayes & Hanseley Reissued Aug. 9, 1932 Re. 18,559

UNITED STATES PATENT OFFICE

EDWIN R. SMITH AND ALBERT SCHINKEZ, OF SENECA FALLS, NEW YORK, ASSIGNORS TO SENECA FALLS MACHINE COMPANY, OF SENECA FALLS, NEW YORK, A CORPORATION OF MASSACHUSETTS

WORK HANDLING MECHANISM FOR MACHINE TOOLS

Original No. 1,841,988, dated January 19, 1932, Serial No. 335,599, filed January 28, 1929. Application for reissue filed February 29, 1932. Serial No. 595,953.

This invention relates to a machine tool and is shown embodied in an automatic lathe, although not limited in its application to that particular type of machine. Such machine tools are coming into wide use for the economical production of duplicate machine parts, such as pistons for automobile engines.

One important object of our invention is to provide improved and simplified mechanism for feeding work to such a machine tool and for removing the finished work therefrom.

In the preferred form, our improved feeding mechanism is fluid operated and cam controlled.

A further object of our invention is to provide fluid operated work-supporting and work-driving mechanism operable in timed relation to said work-feeding mechanism and similarly controlled.

Another object is to provide a fluid operated main driving clutch, so controlled that on failure to provide fluid pressure for actuating said work-feeding, work-supporting and work-driving devices the main driving clutch will simultaneously become inoperative and all movements of the machine will cease.

Our invention further relates to arrangements and combinations of parts which will be hereinafter described and more particularly pointed out in the appended claims.

A preferred form of the invention is shown in the drawings, in which

Fig. 10 is a front elevation of the work-feeding mechanism, looking in the direction of the arrow 10 in Fig. 4;

Fig. 11 is a view similar to Fig. 8, but showing the parts in a different position;

Fig. 12 is a detail sectional view of parts of the gripper mechanism on an enlarged scale, taken along the line 12—12 in Fig. 11;

Fig. 13 is a partial plan view of the gripping members;

Fig. 14 is a side elevation of an outer piston member;

Figs. 15 and 16 are a side elevation and plan respectively of an inner piston member;

Fig. 17 is an end elevation of the tail stock;

Fig. 18 is a sectional plan view thereof;

Fig. 19 is a sectional plan view of certain work-supporting and work-driving mechanism;

Fig. 20 is an end elevation of the work driving member, showing its co-operation with the work;

Fig. 21 is a sectional plan view showing the co-relation of the head and tail centers and the work-driving member with the work;

Fig. 22 is a plan view of certain pneumatic control mechanism;

Fig. 23 is a front elevation thereof, looking in the direction of the arrow 23 of Fig. 22;

Figure 35:
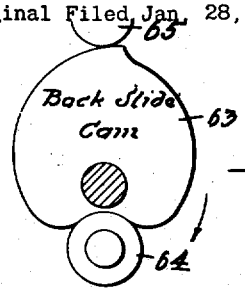
Figure 36:
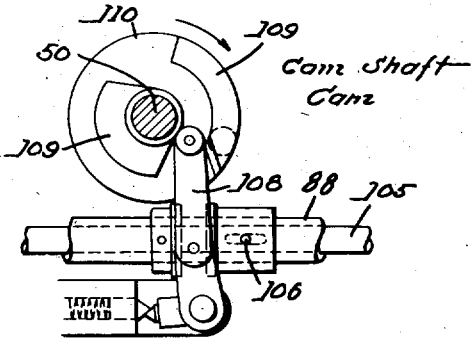
Figure 37:
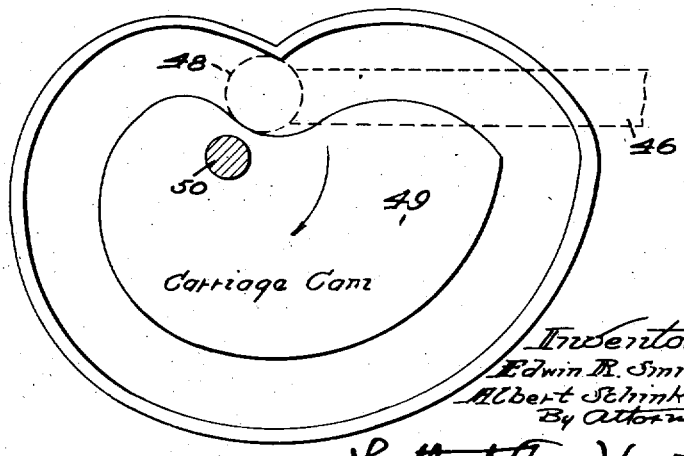

Figs. 24 and 25 are sectional plan views, taken along the lines 24—24 and 25—25 respectively in Fig. 23;

Fig. 26 is a sectional elevation of a certain piston valve mechanism, taken along the line 26—26 in Fig. 22;

Figs. 27 and 28 are sectional plan views, taken along the lines 27—27 and 28—28 respectively in Fig. 26;

Figs. 29 and 30 are sectional elevations, showing the high and low pressure air connections, taken along the lines 29—29 and 30—30 respectively in Fig. 23;

Fig. 30[a] is a diagrammatic sectional elevation showing certain air-control connections;

Figs. 31, 32, 33 and 34 are side elevations of the cams for operating the different control valves for the pneumatic mechanism;

Fig. 35 is a plan view of the cam which operates the back tool slide;

Fig. 36 is a side elevation of the cam and clutch connections controlling the fast and slow speed of the main cam shaft, and Fig. 37 is a side elevation of the cam for actuating the front tool slide or carriage.

Figure 1:
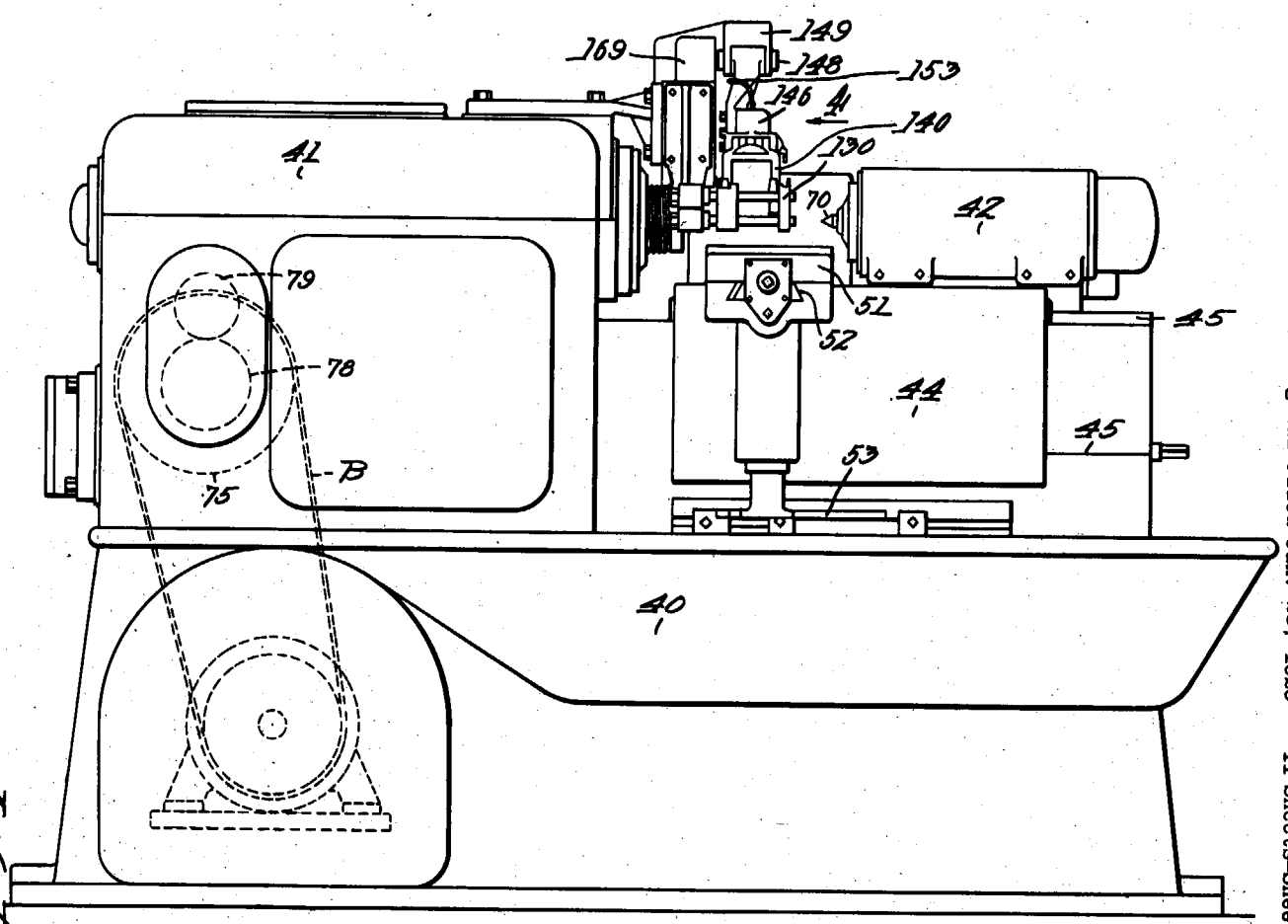
Fig. 1 is a front elevation of an automatic lathe embodying our improvements.
Figure 2:
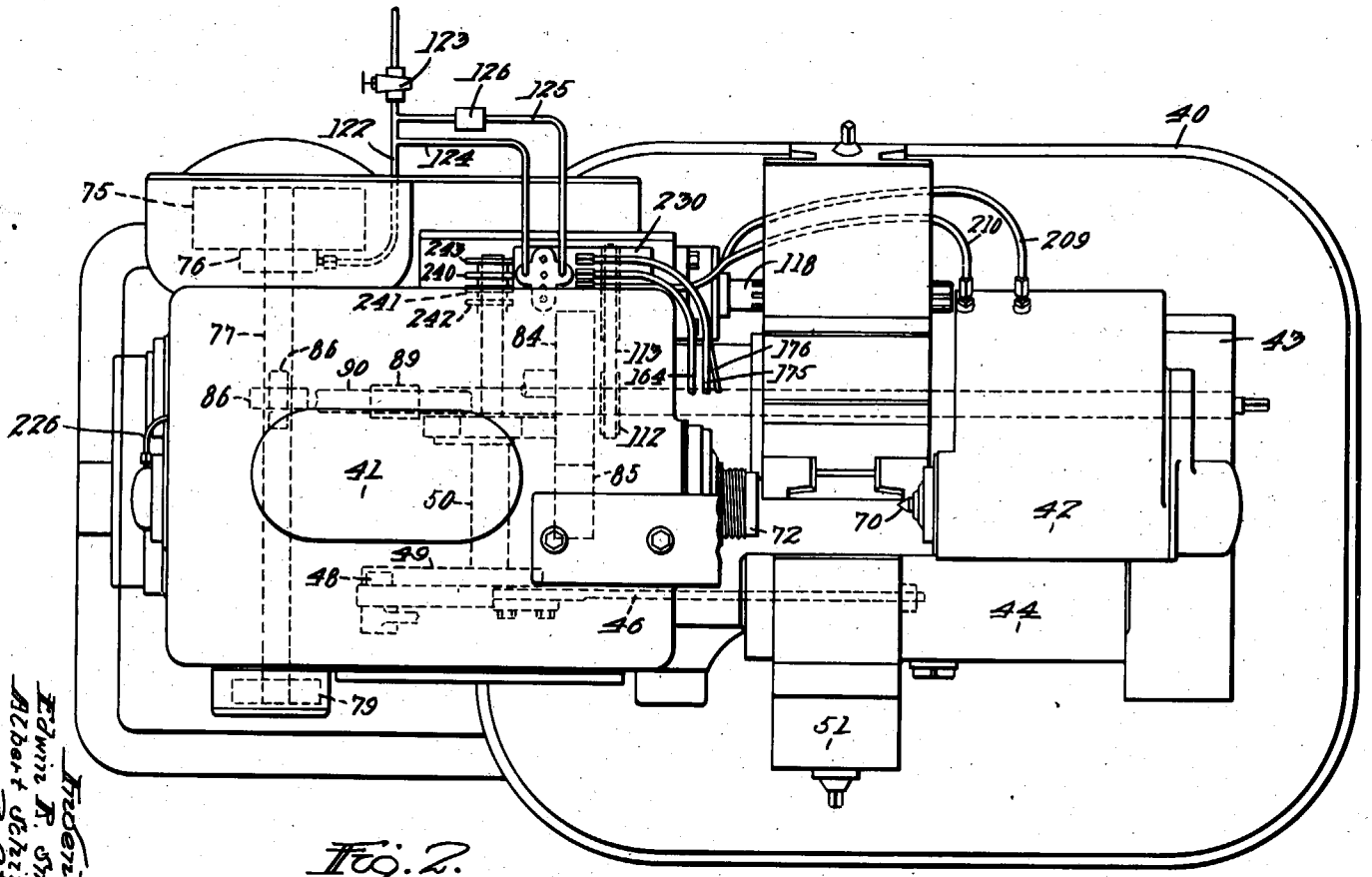
Fig. 2 is a plan view thereof.

Referring to Figs. 1 and 2, we have shown our invention embodied in an automatic lathe particularly adapted for the finishing of pistons for automobile engines or other similar articles.

*General construction*

Our improved lathe comprises a bed or frame 40 having a head stock 41 and a tail stock 42. The head stock 41 is permanently secured to the bed 40 and the tail stock 42 is slidable on guideways 43 (Fig. 17) fixed on the bed 40.

Our copending application Serial No. 401,555, filed October 22, 1929, is directed to the details of construction of the back tool slide and reference is made thereto for more specific information.

A front tool carriage 44 (Fig. 1) is slidable on ways 45 at the front of the bed 40 and is connected by a link 46 (Fig. 2) to an arm 47 (Fig. 3) having a cam roll 48 engaged by a side cam 49 mounted on a main cam shaft 50. A front tool slide 51 is mounted in guideways 52 (Fig. 1) in the carriage 44 and is moved to engage the work by a cam plate 53 secured on the bed 40.

The construction of the tool slide and the mechanism for actuating the same forms no part of our present invention and is fully disclosed in our prior application Serial No. 294,005, filed July 19, 1928.

A back tool slide 60 is also mounted in guideways on a support 61 which is adjustable lengthwise of the machine along the guideways 43 which support the tail stock 42.

For the purposes of this application it may be stated that the slide 60 is moved toward and from the work by a cam 63 (Fig. 35) engaging a cam follower or roll 64 fast on the tool slide and a second roll 65 yieldingly mounted on the tool slide.

The work W (Fig. 21) is supported at one end by the tail center 70 and at its opposite or open end it is held against a conical end portion 73 of a support 71, secured to the front end of the work driving spindle 72.

*Driving connections*

Figure 3:
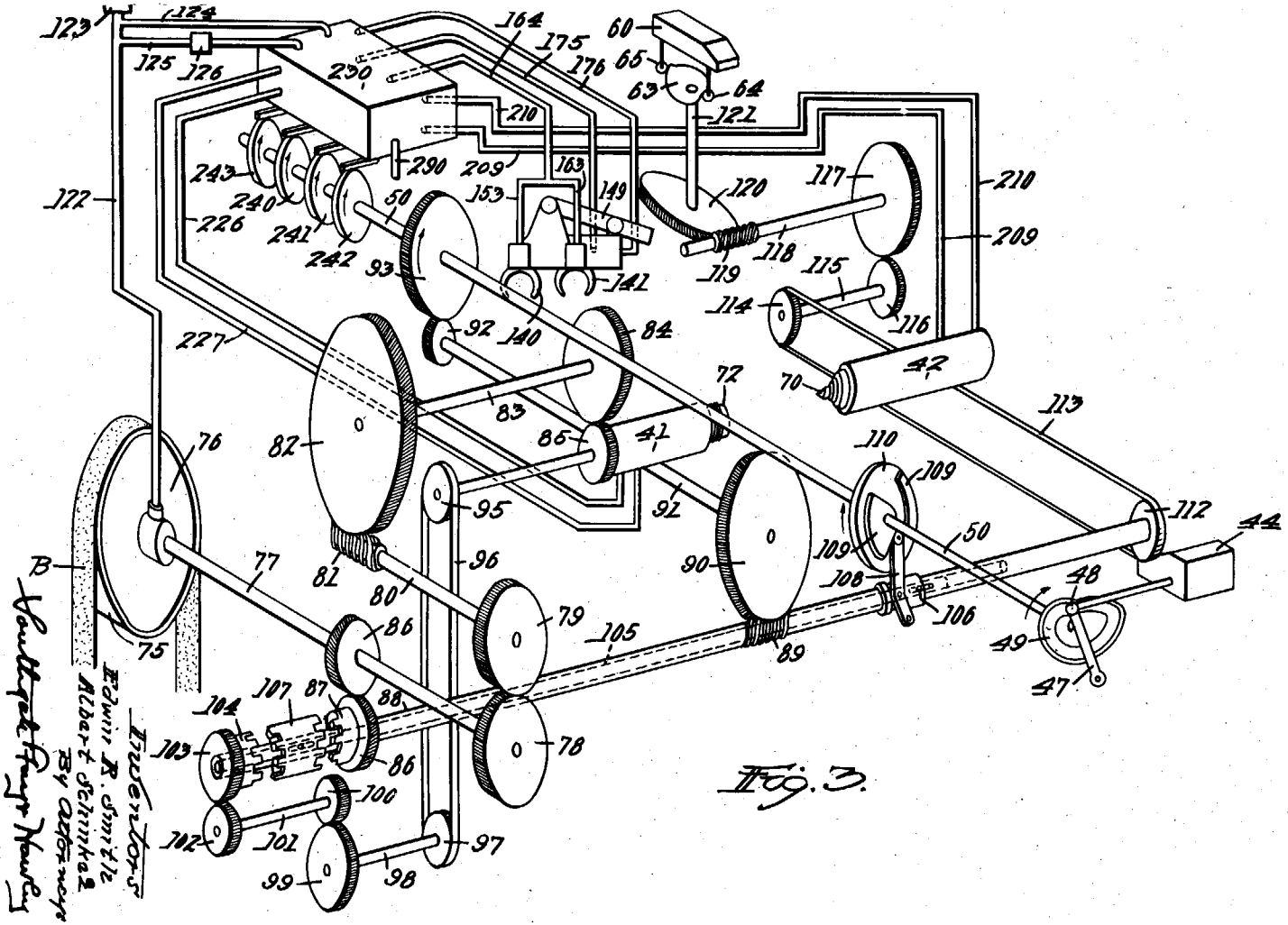
Fig. 3 is a diagrammatic perspective view, showing the relation and driving connections for the various parts of the lathe.

The mechanism for driving the work supporting spindle 72, the front carriage cam 49 and the back tool slide cam 63 is illustrated diagrammatically in Fig. 3.

Power is applied through a belt B to a pulley 75, connected by a pneumatic clutch 76 to a main driving shaft 77. The shaft 77 is connected by gears 78 and 79 to a worm shaft 80 having a worm 81 engaging a worm wheel 82 on a shaft 83. The shaft 83 is connected to the work spindle 72 by gears 84 and 85, thus positively rotating the work at constant speed.

The main shaft 77 is also connected by spiral gears 86—86 to a clutch 87 loose on a worm shaft 88. The shaft 88 has a worm 89 meshing with a worm wheel 90. The worm wheel 90 is fixed on a shaft 91, connected by gears 92 and 93 to the main cam shaft 50 on which the tool carriage cam 49 is mounted.

A sprocket 95 rotatable with the work spindle 72 is connected by a chain 96 and sprocket 97 to a shaft 98, which in turn is connected by gears 99 and 100 to a shaft 101, connected in turn by gears 102 and 103 to a second clutch member 104, also loose on the shaft 88.

A rod 105 is slidable axially in the worm shaft 88 but is keyed thereto by a pin 106. A clutch member 107 is secured on the rod 105 and may be moved axially thereby to engage either the clutch member 87 or the clutch member 104. The axial position of the rod 105 is controlled by a cam lever 108 (Fig. 36), positioned by cam plates 109 on the side of a disc 110 on the cam shaft 50.

The cam shaft 50 (Fig. 3) may thus be rotated at relatively high speed during the return movement of the tool carriage 44 by engaging the clutch member 107 with the clutch member 87, the driven then being direct from the shaft 77 to the worm shaft 88 through the spiral gears 86. During the operation of finishing the work, the clutch member 107 is shifted to engage the clutch member 104 and a slow speed drive is obtained from the work spindle 72 through the sprockets 95 and 97, gears 99 and 100 and gears 102 and 103 to the worm shaft 88.

It will be noted that the shift from high to low speed is controlled by the cam plates 109 on the cam disc 110, which in turn is mounted on the main cam shaft 50 and rotates in unison with the carriage cam 49.

The worm shaft 88 is also connected by a sprocket 112, chain 113 and sprocket 114 to a shaft 115 connected in turn by gears 116 and 117 to a worm shaft 118 having a worm 119 engaging a worm wheel 120 on the lower end of a shaft 121 which supports the cam 63 which operates the back tool slide 60.

The driving connections are so proportioned that the back slide cam 63 makes one rotation for every rotation of the carriage cam 49.

*Air supply*

The pneumatic clutch 76 (Fig. 3) receives air under pressure through a pipe 122 controlled by a main valve 123. The pipe 122 is also connected by branch pipes 124 and 125 to pneumatic mechanism to be described, by which various operations of the lathe are controlled. The pipe 124 is supplied with air at full pressure from the pipe 122, but the pipe 125 is provided with a reducing valve 126 and thus supplies air at a lower pressure to the mechanism connected thereto.

It will be noted that failure of air pressure in the pipe 122, either by closing the valve 123 or from some accidental cause, will also cause failure of air pressure in the pipes 124 and 125, so that if the clutch 76 is released, all of the pneumatically controlled devices of the machine will become inoperative, and if the pneumatically controlled devices became inoperative, the main driving clutch will be disengaged. This is an important protective feature.

*Work-feeding mechanism*

Our improved work-feeding mechanism is shown in successive positions in Figs. 4 to 7 of the drawings, and details of the mechanism are shown in Figs. 8 to 16 inclusive.

Figure 4:
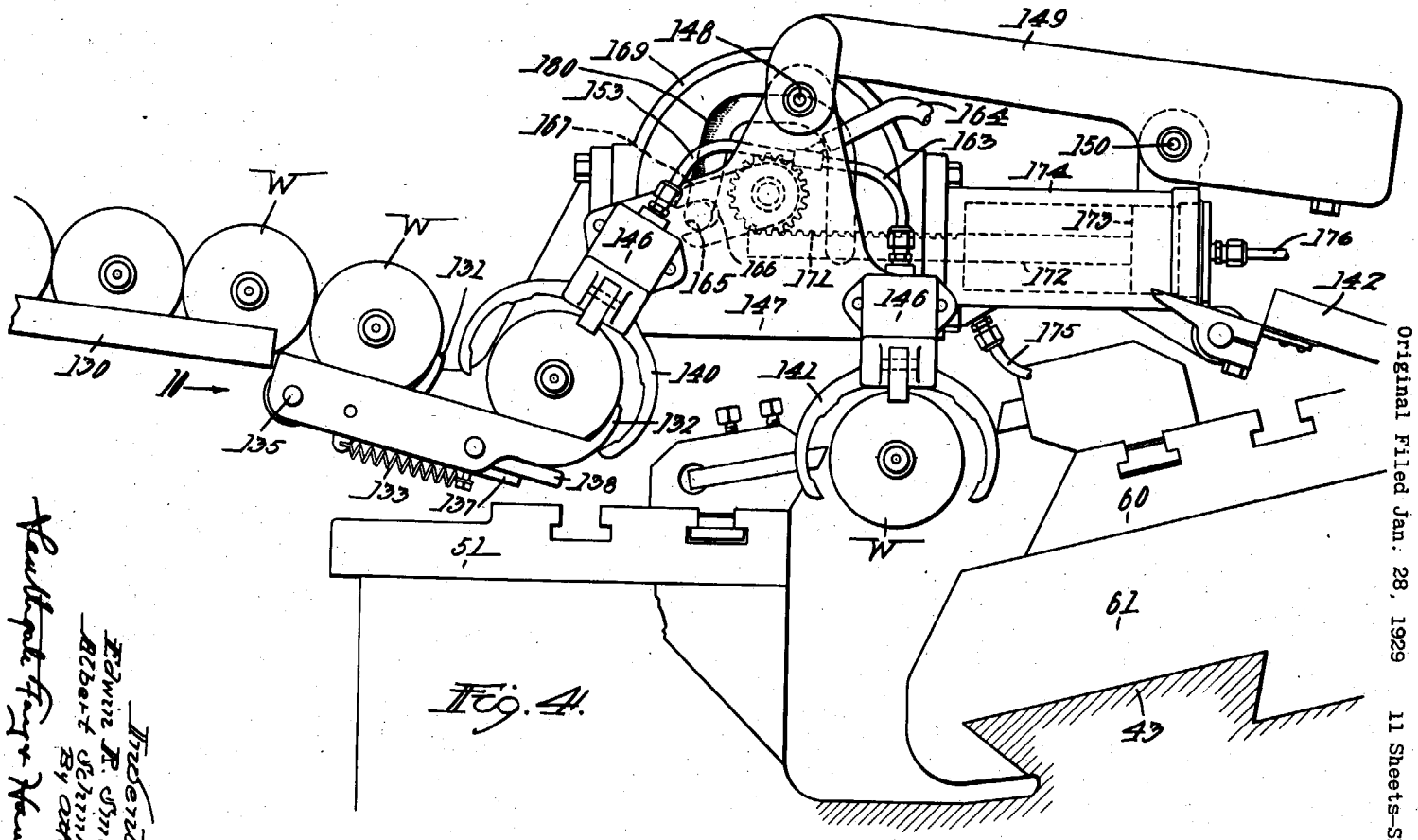
Fig. 4 is an end elevation of the work-feeding mechanism, looking in the direction of the arrow 4 in Fig. 1.

Referring particularly to Fig. 4, the new pieces of work W are mounted on a runway 130, the lower portion of which is provided with a dog 131 controlling the release of successive pieces of work. A fixed lug or projection 132 at the extreme lower end of the runway stops the released piston in position to be seized and transferred by the work-feeding mechanism.

Figure 5:
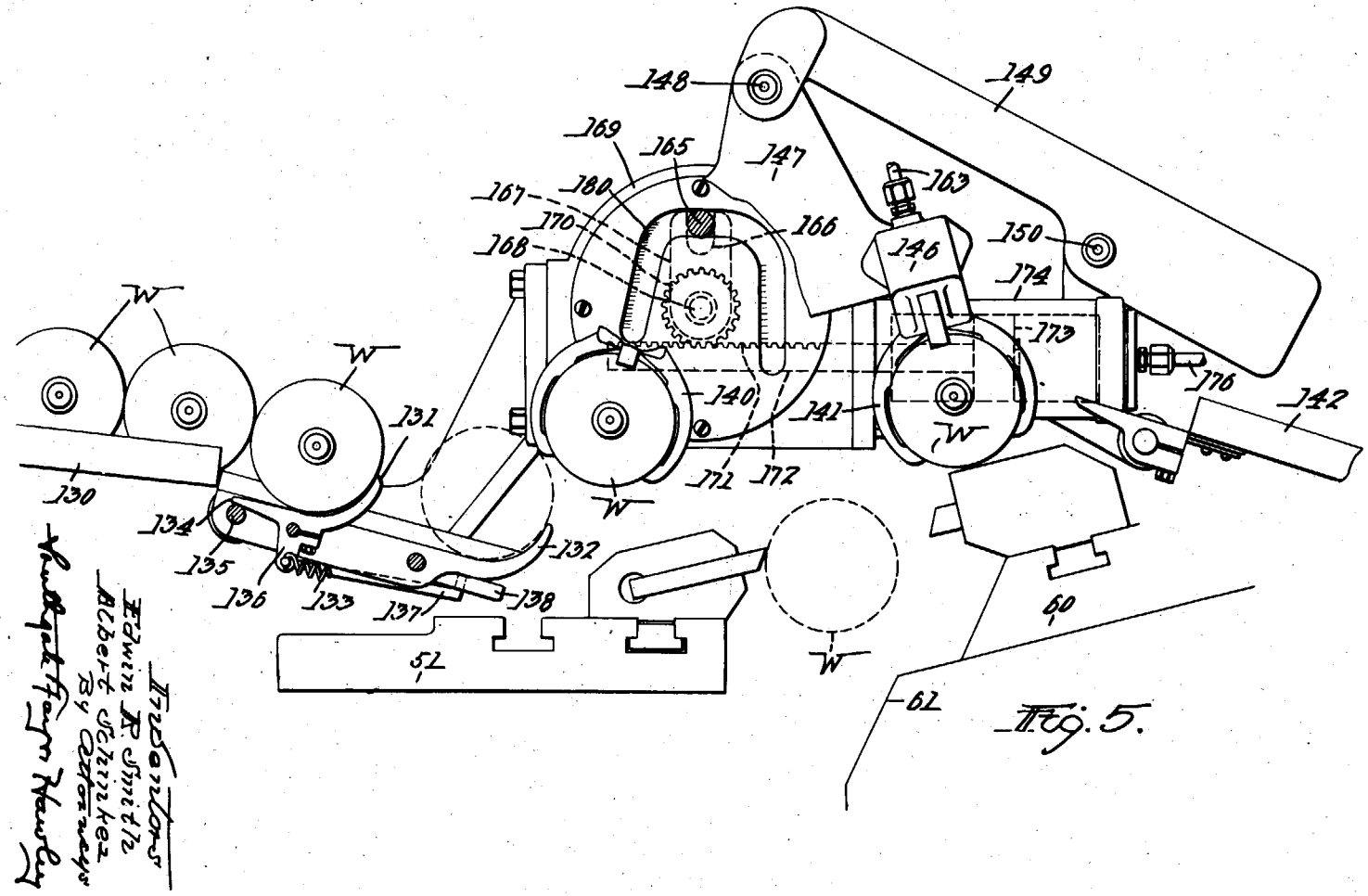
Figs. 5, 6 and 7 are views similar to Fig. 4, but showing the parts in different relative positions.

The dog 131 is normally held in the position shown in Fig. 5 by a spring 133 which causes a rearward projection 134 of the dog to engage a cross pin 135. A depending arm 136 of the dog is connected by a link 137 to a lever 138 which is engaged by a tool carriage 44 as it completes its working stroke. Such engagement rocks the dog 131 to release the lowermost piston W or other piece of work. When thus rocked, the rearward projection 134 of the dog swings upward and prevents the escape of more than a single piston.

Details of this holding and releasing mechanism are more fully shown and described in our copending application Serial No. 294,005, filed July 19, 1928.

*Gripper mechanism*

We will now describe the gripper mechanism which we have provided for inserting fresh pieces of work and for removing finished pieces of work. For this purpose, we provide two pairs of gripping jaws 140 and 141, the jaws 140 acting to feed the work to the machine and the jaws 141 to remove the work from the machine. When thus removed, the work is released on a delivery runway 142 (Fig. 5).

Figure 8:
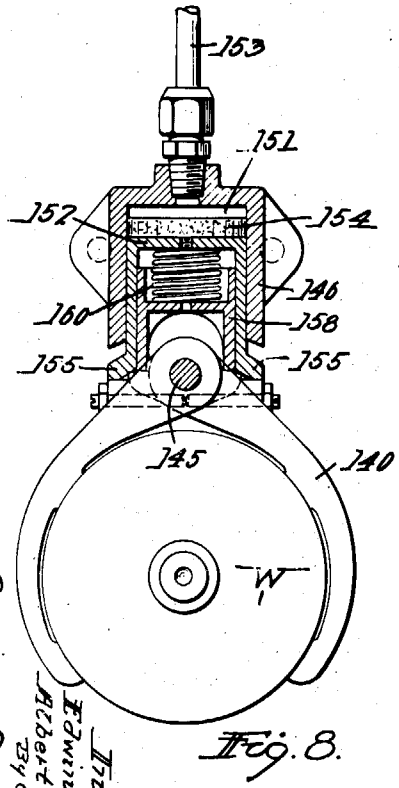
Fig. 8 is a sectional elevation of one of the work-gripping devices and its pneumatic operating mechanism.

The details of construction of the gripper mechanism are best shown in Fig. 8 and in Figs. 11 to 16 inclusive. The feeding and delivery grippers are identical in construction and a description of the feeding grippers 140 and their actuating mechanism will apply equally to the delivery grippers 141.

The two gripping members 140 are identical in construction and the pivot lugs 143 thereof overlap in staggered relation, as clearly shown in Fig. 13. A stud 145 extends through the lugs 143 on the two grippers 140 and also through bearing openings in the lower portion of a gripper supporting member 146. The supporting members 146 for the two pairs of grippers are secured on a rock plate 147 (Fig. 4), the upper end of which is pivoted at 148 to a counterbalanced lever 149, which in turn is mounted on a fixed pivot 150.

A cylinder 151 (Fig. 8) is formed in each supporting member 146 above its stud 145. An outer piston 152 is slidable in the cylinder 151 and may be forced downward by admitting air under pressure through a pipe 153 to the upper end of the cylinder 151.

The piston 152 is provided with a suitable cup packing 154 (Fig. 11) at its upper end and on its opposite sides is provided with depending and outwardly projecting lugs 155, engaging abutments 156 on the grippers 140. When the cylinder 152 is depressed, the grippers 140 are moved inward to clamp and hold the work.

A second or inner piston 158 (Fig. 15) is slidable in a cylindrical recess 159 in the outer piston 152. A spring 160 is interposed between portions of the pistons 152 and 158 and acts yieldingly to force the inner piston 158 downward and the outer piston 152 upward.

At its lower end, the inner piston 158 is provided with offset lateral projections 161 (Figs. 15 and 16), positioned to engage projecting surfaces 162 (Figs. 11 and 13) on the grippers 140.

When there is no air pressure in the pipe 153, the spring 160 moves the outer piston 152 to upper or inoperative position, and at the same time moves the inner piston 158 downward, engaging the projections 162 and causing the grippers 140 to be separated, as indicated in Fig. 11.

When air pressure is applied through the pipe 153, the outer piston 152 moves downward, as indicated in Fig. 8, closing the grippers 140 and at the same time causing the inner piston 158 to move upward against the pressure of the spring 160. By the simple admission or release of air pressure in the pipe 153, we are thus able to close or open the grippers 140 as desired. By similar control of the air pressure in the pipe 163 the opening and closing of the delivery grippers 141 may be controlled. The pipes 153 and 163 commonly have a joint air supply pipe 164 (Figs. 3 and 4) and are thus simultaneously operated.

*Gripper moving mechanism*

Special provision is made for moving the grippers to their successive positions. For this purpose the rock plate 147 (Fig. 4) is provided with a pin or stud 165 (Fig. 9) extending through a slot 166 (Fig. 7) in an arm 167 (Fig. 9) mounted to rotate on a horizontal stud 168 mounted in a casing 169 secured to the frame of the machine.

A pinion 170 is also fast on the stud 168 or is fixed to the arm 167, and is engaged by rack teeth 171 (Fig. 7) formed on the piston rod 172 connected to a piston 173. The piston 173 is slidable in a cylinder 174, mounted in fixed position, and having air pipes 175 and 176 (Fig. 7) connected to the opposite ends thereof.

Suitable mechanism to be described controls the shifting of the connections of the pipes 175 and 176 to an air supply or to the atmosphere, as may be desired.

When air is admitted through the pipe 175, the piston 173 is moved to the right, as indicated in Fig. 4, and the gripping members 140 and 141 are moved to work-gripping position.

Figure 6:
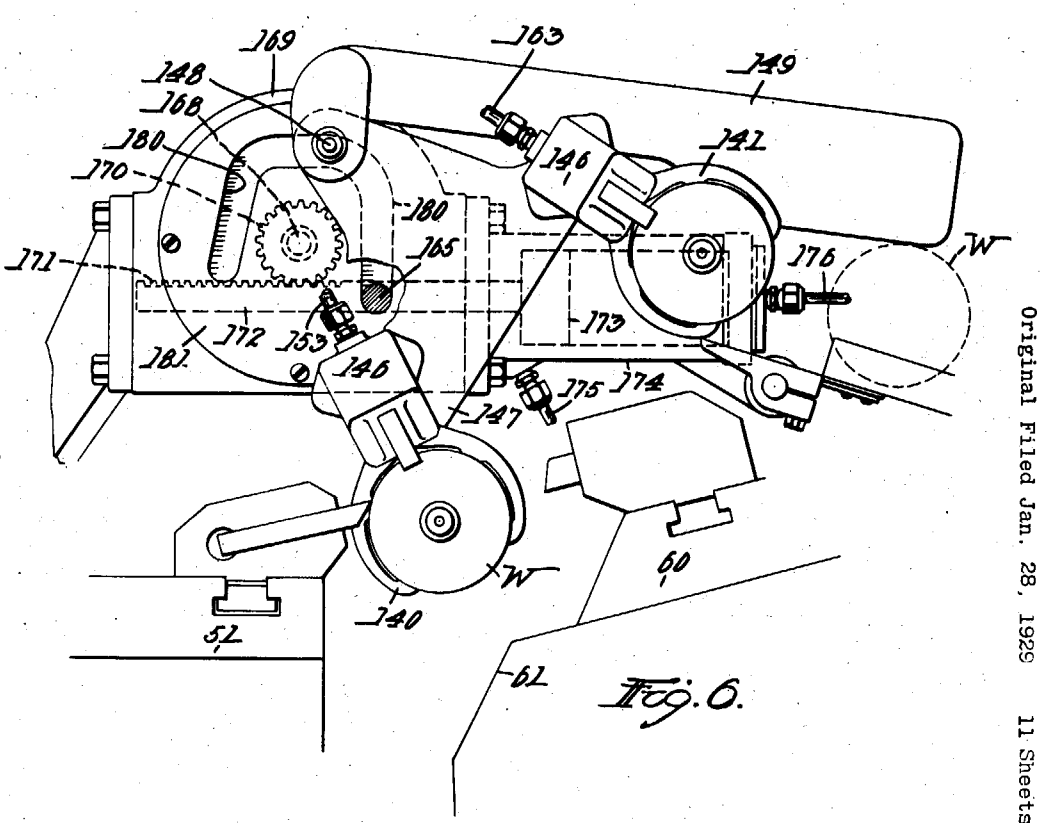

If the pipe 175 is then connected to the exhaust and air is admitted through the pipe 176, the piston is moved to its left hand position, as indicated in Fig. 6, the grippers raising and swinging the work and finally positioning the new piece of work between the head and tail centers and the finished piece of work in delivery position.

Figure 7:
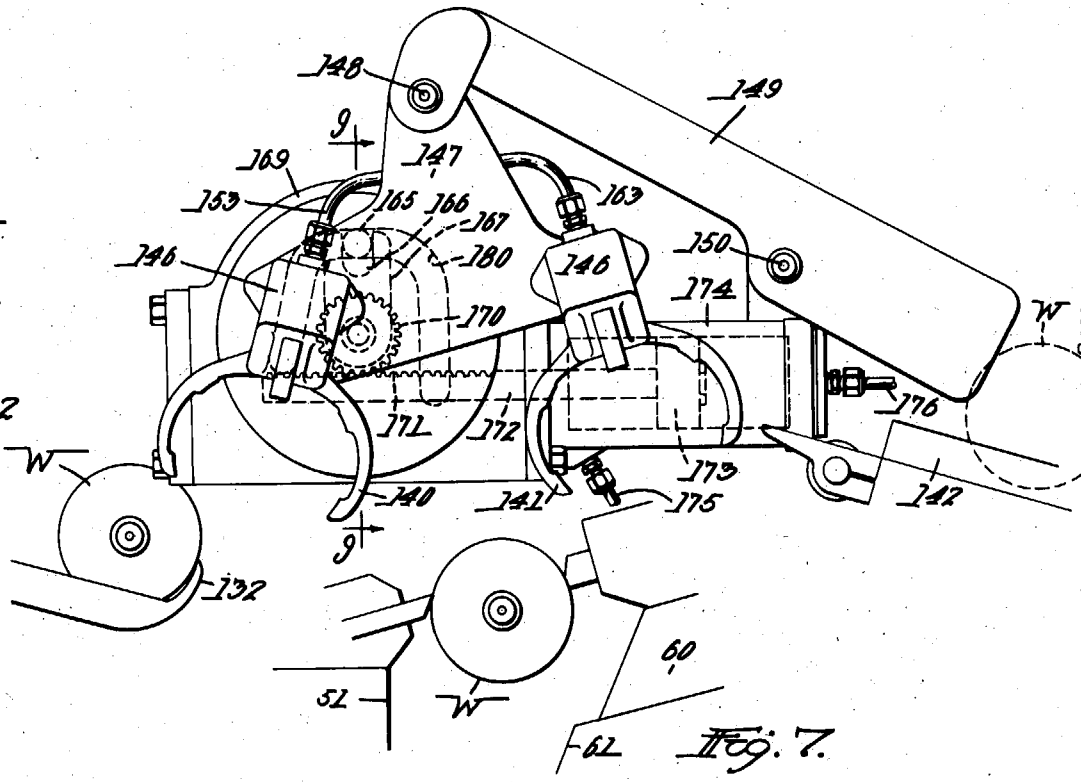

If the air admission is then again shifted to the pipe 175, the piston will be moved to the mid-position shown in Fig. 7 and may be held in such mid-position by admitting air equally through both pipes 175 and 176. The grippers will then be in raised, open and inoperative position, which position they will continue to occupy during the machine operations on the work.

Figure 9:
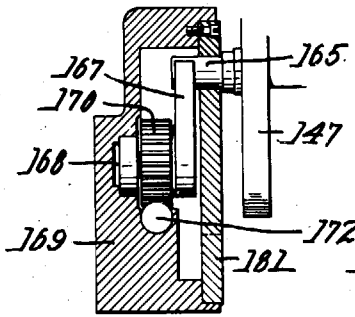
Fig. 9 is a sectional elevation of certain actuating mechanism, taken along the line 9—9 in Fig. 7.

The raising and lowering of the grippers simultaneously with the swinging movement thereof is accomplished by passing the stud 165 (Fig. 6) through a fixed cam slot 180 formed in a plate 181, which constitutes the front face of the casing 169 (Fig. 9). As the stud 165 is caused to traverse the cam groove 180, the pivotal support 148 (Fig. 5) of the plate 147 swings in an arc about the pivot 150 of the counterweight lever 149.

The admission of air to the cylinder 174 (Fig. 7) and also to the gripper cylinders 151 is controlled by cam mechanism to be described. For present purposes, it may be stated that air is admitted through the pipes 153 and 163 to close the grippers 140 and 141 as soon as the parts reach the positions indicated in Fig. 4, and that the air supply is cut off and the grippers are released as soon as the parts reach the positions indicated in Fig. 6.

*Tail stock mechanism*

The details of the tail stock 42 are best shown in Figs. 17 and 18. The tail center 70 is mounted in a support 200 slidable in a cylindrical opening in the tail stock 42. A rock arm 201 swings upon a fixed pivot 202 and the opposite ends of the rock arm are seated in recesses 203 and 204 in the sliding support 200 and in a plunger 205 respectively.

The plunger 205 is slidable in a suitable fixed bearing and is attached to a piston 206 slidable in a cylinder 207 formed in the tail stock 42 and closed by a threaded cap 208. Pipes 209 and 210 are connected to the cylinder 207 on opposite sides of the piston 206 and either of these pipes may be connected to the air supply or to the atmosphere, as may be desired.

When air is admitted through the pipe 209, the tail center 70 is yieldingly advanced to engage the work. When air is admitted through the pipe 210, the tail center 70 is withdrawn from the work. An adjustable stop screw 211 engages a washer 211[a] which abuts one end of a slidable sleeve 211[b] which surrounds the plunger 205 and constitutes means for tightening the packing in the stuffing box 213 of the plunger 205.

The connection of the pipes 209 and 210 to the air supply or to the atmosphere is controlled by cam mechanism to be described.

*Work positioning and work driving mechanism*

As previously stated, the work W is supported at its closed or rear end on the tail center 70 and at its open or head end on the conical end of a rotating work support 71, as clearly shown in Fig. 21.

The inner surface of the end of the piston W is engaged by a work positioning member 212 (Figs. 19 to 21) which is slidable within a work driving member 214, which in turn is slidable within the work spindle 72, but is keyed to rotate therewith.

The driving member 214 has a flange 215 engaging a shoulder 216 within the work spindle 72 as said member moves outward, and the outward movement thereof is limited by such engagement. A shoulder 217 on the driving member 214 also engages a shoulder 218 on the work spindle 72 and limits inward sliding movement of the member 214.

The work positioning member 212 has a flange 220 engaging the flange 215 of the driving member 214 when the latter is in outer position. The flange 220, flange 215 and shoulder 216 thus definitely limit outward axial movement of the work positioning member 212. The work support 71 (Fig. 19) is axially slidable and is held yieldingly outward against limit stops 221 by springs 221[a].

A piston rod 222 (Fig. 19) is connected to the member 212 at one end and at the opposite end to a piston 224 slidable in a cylinder 225 mounted in the head-stock 41. Air under pressure is admitted to the ends of the cylinder 225 through pipes 226 and 227.

When pressure is applied through the pipe 226, the work positioning member 212 and work driving member 214 are advanced to the operative position indicated in Fig. 21. When air under pressure is admitted through the pipe 227, the work positioning and work driving members are withdrawn, as indicated in Fig. 19.

It will be noted that the travel of the work driving member is only about one-half of the travel of the work positioning member, as the work driving member is projected only far enough to engage the connecting rod bosses 228 within the piston W, as indicated in Fig. 20, by which engagement the piston W is positively rotated.

The travel of the tail center is controlled by the adjustable stop screw 211 (Fig. 18) co-operating with the plunger 205 but this travel is always sufficient to protect the tail center somewhat beyond the desired working position. The advance of the tail center overcomes and compresses the springs 221[a] behind the work support 71.

The work positioning member 212 is then advanced toward the tail center and with sufficient force to overcome the air pressure in the tail center cylinder 207, moving the tail center backward until the positioning member 212 has reached the fixed outward position shown in Fig. 21. The work is thus axially and accurately positioned from the inner surface of the closed end of the piston W.

It is common to provide higher air pressure in the cylinder 225 in order to effectively overcome the resistance of the tail center 70. The supply of this high pressure air to the cylinder 225 is controlled by cam mechanism to be described.

*Pneumatic control mechanism*

We will now describe the pneumatic control mechanism by which the several parts of the lathe are co-ordinated and caused to operate in a desired timed relation.

The air supply pipes for the various pneumatic devices previously described are all connected with air passages in a valve casing 230 (Figs. 22 and 23) in which a plurality of piston valves 231, 232, 233 and 234 (Fig. 26) are slidably mounted.

These valves are engaged by rocker arms 235 (Fig. 23) pivoted at 236 and provided with rolls 237 engaged by cams 240, 241, 242 and 243 (Figs. 31 to 34), said cams being mounted to rotate with the cam shaft 50 previously described. Suitable springs 254 (Fig. 26) are provided for depressing the piston valves 231 to 234. The cams 240 to 243 thus make one revolution for each reciprocation of the front tool carriage 44.

The high pressure air supply pipe 124 (Fig. 3) is connected through a passage 250 (Fig. 30) to the valve space controlled by the piston valve 231. The pipes 226 and 227 (Fig. 3), which supply air to the cylinder 225 for moving the work positioning member 212, are connected through passages 251 (Fig. 25) and 252 (Fig. 26) to openings in the casing of the valve 231 above and below the opening 250 previously described. (See Fig. 23.)

Figure 34:
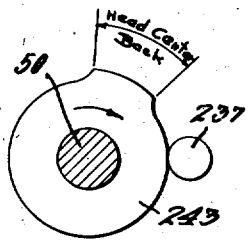

When the piston valve 231 (Fig. 30[a]) is raised by its cam 243, high pressure air is admitted to the pipe 227, and the work positioning and work driving members 212 and 214 are withdrawn. When the cam roll 237 for the valve 231 thereafter engages the low part of the cam 243, as shown in Fig. 34, the piston valve 231 is moved to its lower position and admits high pressure air to the pipe 226, thus advancing the work positioning and work driving members 212 and 214 to operative position.

The low pressure air supply pipe 125 (Fig. 3) is connected through suitable branch passages 255 (Fig. 29) to openings 256 (Fig. 26) in the fixed sleeves or bushings in which the valves 232, 233 and 234 are mounted.

The pipes 209 and 210 (Fig. 3) controlling the movements of the tail center 70 are connected through passages 260 and 261 (Fig. 23) to openings through the casing sleeve of the piston valve 232 (Fig. 26) above and below the low pressure opening 255 (Fig. 29) therein. When the valve 232 is raised by its cam 242, low pressure air is admitted to the pipe 210 and the tail center is withdrawn from operative position, but when its cam follower roll 237 engages the lower part of the cam 242, air is admitted to the pipe 209 to advance the tail center 70 and hold the same yieldingly against the work.

The pipe 164 (Fig. 3) controlling the operation of the work grippers, is connected through a passage 270 (Fig. 25) to an opening below the low pressure inlet for the piston valve 233. As the pneumatic mechanism for the grippers is single-acting, only a single air connection is required.

When the cam follower 237 for the piston valve 233 engages the high point of its cam 241, the piston valve 233 is raised to admit low pressure air to the pipe 164 and the grippers are caused to engage the work. When the roll 237 is on the low part of the cam, the grippers are opened, which is their normal condition during the finishing of the work.

Figure 31:
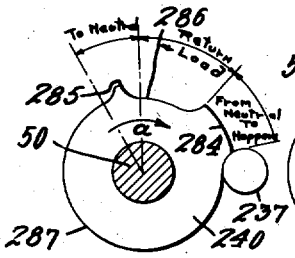
Figure 32:
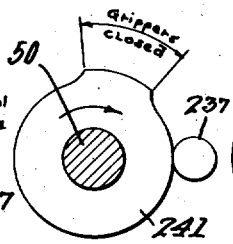
Figure 33:
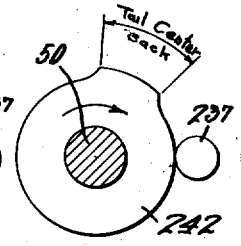

The pipes 175 and 176 (Fig. 3), which control the movements of the piston 173 which positions the grippers, are connected through passages 280 (Fig. 24) and 281 (Fig. 25) to upper and lower openings in the casing of the piston valve 234. The valve 234 is controlled in its movements by the irregular cam 240 (Fig. 31). This cam is provided with high spots 284 and 285, a low portion 286, and an intermediate portion 287.

When the roll 237 is on the intermediate portion 287, the valve 234 will be in mid-position. The middle flange or collar portion of the valve is not quite wide enough to cover the low pressure admission port, and consequently the valves 23ᵃ, when in mid-position, will admit air to both pipes 175 and 176, thus putting both sides of the piston 173 under pressure and holding the piston from movement in either direction.

As the cam 240 rotates in the direction of the arrow *a* in Fig. 31, the roll 237 will pass from the intermediate portion 287 to the high spot 284, raising the valve 234 to admit low pressure air to the pipe 175, and moving the piston 173 to the position shown in Fig. 4, with the grippers in position to grasp the work.

Further rotation of the cam 240 brings the cam follower 237 to the low portion 286 of the cam, reversing the position of the valve 234, and admitting low pressure air to the pipe 176, thus moving the parts to the delivery position shown in Fig. 6.

The roll 237 is then raised very briefly by the narrow high spot 285, causing air to be again admitted through the pipe 175 and moving the parts from the delivery position shown in Fig. 6 to the intermediate or idle position shown in Fig. 7.

At this point, the cam follower passes to the intermediate portion 287 of the cam 240, balancing the air pressures on the piston 173 and holding the parts in the position shown in Fig. 7 until the operations on the inserted piece of work are completed.

Suitable exhaust connections are provided through which one side of each piston may be connected to the atmosphere when pressure is applied to the other side. The main exhaust pipe is indicated at 290 (Figs. 22 and 27) and the upper and lower exhaust connections to the piston valve casings are indicated at 291 and 292 in Figs. 27, 28 and 30ᵃ.

When a piston is raised by its control valve, air is admitted to the lower air pipe controlled thereby and the upper air pipe is simultaneously connected to the exhaust. When the piston is lowered, the connections are reversed.

Fig. 30ᵃ shows the connections for actuating the work driving member 212. The valve 231 is raised, connecting the air supply passage 250 to the pipe 227 and connecting the pipe 226 to the exhaust pipe 290. When thus connected, the member 212 will be withdrawn.

*General operation of the machine*

Having described the details of construction, the general operation of the machine will be readily understood. Assuming that a piece of work has been completed the tool slides will be automatically withdrawn and at the same time the gripper mechanism will be moved to work gripping position. The tail center 70 will be withdrawn and the work positioning and work driving members in the head spindle will also be withdrawn.

The grippers will then swing the new work blank to operative position and the finished work to delivery position, holding the blank until the tail center and work positioning and work driving members have all been returned to operative position. The grippers are then opened and are returned to their idle or intermediate position, where they remain during the operations on the inserted work.

The entire operation of the machine is automatic and the several movements occur in predetermined timed relation and in accordance with the design and setting of the cams 240 and 243. The provision of pneumatic connections permits a certain amount of yield in case of accidental obstruction to any of the operations, or in case of a variation in the dimensions of the blanks. This is particularly desirable for the gripper mechanism, which frequently grasps blanks of increased diameter.

The advantages of controlling the main driving clutch from the same air supply as the other operating mechanism have been previously pointed out, this connection preventing operation of any part of the machine if the pneumatic control is out of action.

Having thus described our invention and the advantages thereof, we do not wish to be limited to the details herein disclosed, otherwise than as set forth in the claims, but what we claim is:—

1. In a machine tool, a work feeding device, work supporting devices, work driving devices, a work removing device, and fluid actuated means to operate said devices, and control mechanism effective to cause actuation of said feeding, work-supporting, and work-driving devices by said fluid operated means in predetermined timed succession.

2. In a machine tool, a work feeding device, a work supporting head, a tail center, a driving device associated with said head, a work removing device, and automatic means effective to advance said tail center and said driving device to operative positions in predetermined timed relation relative to each other and to said work feeding and removing devices, and control mechanism effective to cause actuation of said several devices by said automatic means in predetermined timed succession.

3. In a machine tool, a work-supporting head, a tail center, a driving device associated with said head, fluid-operated means to advance said tail center and said driving device to operative positions, an automatic controlling device for said fluid-operated means, and control mechanism effective to cause actuation of said work-supporting head and driving device by said fluid-operated means in predetermined timed succession.

4. In a machine tool, a work feeding device, a work-supporting head, a tail center, a driving device associated with said head, a tool slide, means to reciprocate said tool slide, and fluid-actuated means effective to actuate said feeding device and to advance said tail center and said driving device to operative positions in timed relation to the reciprocating movements of said tool slide, and control mechanism effective to cause actuation of said feeding, work-supporting and work driving devices by said fluid operated means in predetermined timed succession.

5. In a machine tool, a work-supporting head, a tail center, a driving device associated with said head, a driving clutch for said machine tool, fluid-operated control means for said clutch, fluid-operated means to advance said tail center and said driving device to operative positions, and a single supply of fluid under pressure for said clutch control means and for said means which operates said tail center and said driving device.

6. In a machine tool, a work-supporting device, a work driving device, and fluid actuated means effective to operate said supporting device and said driving device, means to supply fluid for moving said driving device to operative position at higher pressure than the fluid for actuating said work supporting device, and control mechanism effective to cause actuation of said work supporting and work driving devices by said fluid operated means in predetermined timed succession.

7. In a machine tool, a work feeding device, a driving head, a yielding work-supporting member mounted therein, a yieldingly advanced tail center effective to overcome the yielding axial resistance of said head member, and a work-positioning device movable axially toward said tail center to a predetermined operative position as the work is fed, and effective to overcome the yielding axial resistance of said tail center.

8. In a machine tool, a driving head, a yielding work-supporting member mounted therein, a tail center support, means to move said support and said member yieldingly toward each other, and a driving device directly engaging the work and definitely determining the axial position thereof.

9. In a machine tool, a driving head, a yielding work-supporting member mounted therein, a tail center support, means to move said support and said member yieldingly toward each other, and a driving device directly engaging the work and definitely determining the axial position thereof, said driving device being more powerfully actuated than said tail center support.

10. In a machine tool, a driving head, a yielding work-supporting member mounted therein, a tail center support, means to move said support and said member yieldingly toward each other, and a driving device directly engaging the work and definitely determining the axial position thereof, said driving device being actuated with sufficient force to overcome the axial resistance of said tail center support, and a stop to limit the axial movement of said driving device.

11. In a machine tool, work feeding mechanism, work supporting mechanism and work driving mechanism, fluid actuated means effective to operate said feeding mechanism and to move said supporting and driving mechanisms to operative and inoperative positions, and control mechanism effective to cause actuation of said feeding, work-supporting and work-driving mechanisms by said fluid actuated means in predetermined timed succession.

12. In a machine tool, a tool slide, work-supporting mechanism, work feeding mechanism, fluid actuated means to operate said work feeding mechanism, means to reciprocate said tool slide, said means including a driving shaft, and control mechanism effective to cause actuation of said feeding and work-supporting mechanism by said fluid actuated means in predetermined timed succession.

13. In a machine tool having work-supporting means and work-finishing means, in combination, work-feeding mechanism comprising grippers, fluid operated means for actuating said grippers, fluid operated means for moving said grippers to successive operative positions, and control mechanism effective to control both fluid operated means in timed relation to the operations on the work.

14. In a machine tool, a pair of work gripping tongs, a spring actuated device effective to separate said tongs, and a device actuated by fluid pressure effective to close said tongs on the work.

15. In a machine tool, a pair of work-gripping tongs, a spring actuated device effective to separate said tongs, and a device actuated by fluid pressure effective to close said tongs on the work, said latter device overcoming the resistance of said spring actuated device when closing said grippers.

16. In a machine tool, a pair of work-griping members, a cylinder, a fluid-operated outer hollow piston slidable in said cylinder and effective to close said gripping members, a second piston slidable within said first piston, and a spring mounted between said two pistons and effective to move said second piston to separate said members.

17. In a machine tool, a pair of work-gripping members, a cylinder, a fluid-operated outer hollow piston slidable in said cylinder and effective to close said gripping members, a second piston slidable within said first piston, and a spring mounted between said two pistons and effective to move said second piston to separate said members, said spring being overcome by said first piston on application of fluid pressure thereto.

18. In a machine tool, a work holding device, means including a cylinder and fluid operated piston effective to move said device to work-receiving and work-delivery positions and to an intermediate inoperative position, and valve mechanism for said cylinder and piston, effective to cause selective movements of said work-holding device to its several positions.

19. In a machine tool, a work holding device, means including a cylinder and fluid operated piston effective to move said device to work-receiving and work-delivery positions and to an intermediate inoperative position, and valve mechanism for said cylinder and piston effective to cause selective movement of said work-holding device to its several positions, fluid pressure being applied to both sides of said piston to hold said device in intermediate position.

20. In a machine tool, a work holding device, means including a cylinder and fluid operated piston effective to move said device to work-receiving and work-delivery positions and to an intermediate inoperative position, valve mechanism effective to cause selective movement of said work-holding device to its several positions, said control means including a valve for said piston and cylinder, said valve having three control positions corresponding to the three positions of said piston in said cylinder, and automatic means to move said control valve selectively to any one of its three control positions.

21. In a machine tool, a work-supporting spindle, a work driving member axially slidable in said spindle to engage the work, and a work-positioning member axially slidable in said driving member to position the work.

22. The combination in a machine tool as claimed in claim 21, in which means is provided to limit axial movement of said work-driving and work-positioning members.

23. The combination in a machine tool as claimed in claim 21, in which means is provided to limit axial movement of said work-driving and work-positioning members, and in which said work-driving member is moved axially by said work-positioning member.

24. The combination in a machine tool as claimed in claim 21, in which means is provided to limit axial movement of said work-driving and work-positioning members, and in which said work-driving member is moved axially by said work-positioning member, but has a lost-motion connection therewith by which the axial travel of said work-driving member is reduced.

25. In a machine tool, a head center and a tail center each yieldingly movable toward the other, and an axially movable work-positioning member directly engaging an end surface of the work and axially positioning the work therefrom.

26. In a machine tool, work-supporting devices, means to present the work to said devices and to remove the work therefrom, work driving devices, actuating means therefor, and fluid-operated means to render said supporting devices and said presenting and removing means operative in predetermined timed relation.

27. In a machine tool, a work-supporting head, a tail center, a driving device associated with said head, a tool slide, means to reciprocate said tool slide, means to advance said driving device, fluid-operated means to advance said tail center, and controlling devices whereby said slide, driving device and tail center are moved in predetermined timed relation.

28. In a machine tool, work-supporting devices including a movable tail center, work presenting and removing devices, work driving means, fluid-operated means to move said tail center and said work presenting and removing devices, and means to move said work driving means axially in timed relation to the movements of said tail center and work presenting and removing devices.

29. In a machine tool having a work support, a pair of work gripping tongs, a spring actuated device effective to separate said tongs, and a device actuated by fluid pressure effective to close said tongs on the work, and means to move said tongs relative to said support.

30. In a machine tool having a work support, a pair of work gripping tongs, a spring actuated device effective to separate said tongs, and a device actuated by fluid pressure effective to close said tongs on the work, said latter device overcoming the resistance of said spring actuated device when closing said grippers, and means to move said tongs relative to said support.

In testimony whereof we have hereunto affixed our signatures.

EDWIN R. SMITH.
ALBERT SCHINKEZ.